Patented Aug. 3, 1926.

1,594,470

UNITED STATES PATENT OFFICE.

ROBERT SCHWARZ, OF FREIBURG, BREISGAU, GERMANY.

PHOTOGRAPHIC LAYER AND METHOD OF MAKING SAME.

No Drawing. Application filed September 10, 1925, Serial No. 55,618, and in Germany September 12, 1924.

My invention refers to photographic materials and more especially to a layer sensitive to light for use in connection with a suitable carrier such as glass, paper, tissue or the like. It is an object of my invention to provide a sensitive layer of this kind, which, on being exposed to light will show the image projected or printed thereon in a predetermined color.

As is well known to those skilled in the art, complex salts of heavy metals, for instance potassium ferrocyanide or cobalt amines, when exposed to the light in the presence of water, suffer a decomposition which is caused by hydrolysis, the light accelerating such decomposition by catalytic action. For instance Hexamine cobaltic chloride has been shown to be decomposed under the influence of light according to the formula

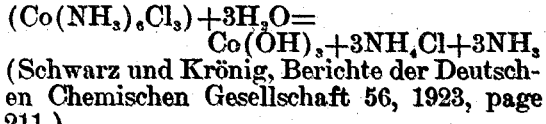

(Schwarz und Krönig, Berichte der Deutschen Chemischen Gesellschaft 56, 1923, page 211.)

In an analogous manner complex salts containing in the complex nucleus the radical of nitrous acid ($NO_2$) in coordinated position are decomposed by hydrolysis under the action of light. With trinitrito triamine cobalt this decomposition takes place according to the formula

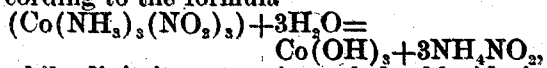

while dinitrito tetramine cobalt chloride is decomposed according to the formula

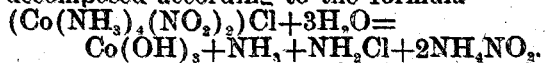

In all these cases the $NO_2$ radical which formed part of a complex compound, is set free in the form of a nitrite. This can easily be shown, if to a watery solution of such a compound which is prepared in the dark, are added potassium iodide and starch. If this limpid solution is exposed to the light, preferably such containing a high percentage of ultra-violet rays, it will assume an intensely blue color owing to the separation of iodine.

According to the present invention the liberation of an $NO_2$ compound (nitrous acid or a nitrite) from nitrito complexes by decomposition under the influence of light is utilized for the diazotization of aromatic amines contained in a suitable vehicle forming a photographic layer, whereby in those parts of this layer, which have been exposed to light, diazo compounds are produced, which are converted into azo dyestuffs by developing, whereupon the complex salt sensitive to light is removed from the non-exposed portion by washing with water, the photographic image being thus obtained in the color of the respective dyestuff.

I have further ascertained, that the photochemical decomposition of nitrito complexes is materially accelerated by the catalytic action of finely distributed bodies, for instance carbon or metals, so that the time of exposure in the printing process can be reduced materially, if such a metal, preferably silver, is present at the places exposed to light. I therefore prefer incorporating in the layer a small quantity of a silver halide sensitive to light, for instance silver chloride. During the printing operation this salt is decomposed and the free silver causes a catalytic acceleration of the diazotization process.

In carrying my invention into practice I may for instance proceed as follows:—

*Example 1.*

Five grams dinitrito tetramine cobalt chloride (croceo chloride), 6 grams m-phenylene diamine, 40 grams gelatine, 1 gram silver nitrate and 500 grams of water are worked into an emulsion which is then applied to paper. The paper thus prepared, after having been exposed to light, is immersed in dilute hydrochloric acid and an image consisting of Bismarck brown (phenylene brown) is obtained. The silver chloride is removed by a short treatment with sodium thiosulfate and the brown image is washed with water.

*Example 2.*

2.5 grams of croceo chloride, 6 grams of the sodium salt of 1.5-naphthyl amine sulfo acid, 6 grams of the sodium salt of 2-oxy-3.6-naphthalene disulfo acid, 20 grams gelatine, 0,5 grams silver nitrate and 250 grams of water are emulsified. The layer formed from this emulsion and exposed to light is immersed a short time in dilute hydrochloric acid, thereafter in a solution of sodium carbonate and is then fixed in sodium thiosulfate. The color of the image is carmine red.

*Example 3.*

2.5 grams croceo chloride, 12 grams of the sodium salt of 1:8-amido naphthol-4.6 disulfo acid, 6 grams of benzidine, 20 grams of gelatine and 1 gram of silver nitrate are emulsified with 200 grams of water. The print obtained is treated as described with reference to Example 2, whereby a blue violet image is obtained.

I wish it to be understood that I do not desire to be limited to the exact materials, proportions and operations described for obvious modifications will occur to a person skilled in the art.

I claim:—

1. As a new product, a layer sensitive to light comprising a vehicle, an azo dye compound and a nitrogen compound capable, when exposed to light, to set free an $NO_2$-compound.

2. As a new product, a layer sensitive to light comprising a vehicle, an azo dye compound and a nitrogen compound capable, when exposed to light, to set free a nitrite.

3. As a new product, a layer sensitive to light comprising a vehicle and a nitrito-complex salt and an azo dye component distributed in said vehicle.

4. As a new product, a layer sensitive to light comprising a vehicle and a nitrito-complex salt of cobalt and an azo dye component distributed in said vehicle.

5. As a new product, a layer sensitive to light comprising a vehicle and an organic nitrito compound of a salt of a heavy metal and an azo dye component distributed in said vehicle.

6. As a new product, a layer sensitive to light comprising a vehicle and an organic nitrito compound of a salt of cobalt and an azo dye component distributed in said vehicle.

7. As a new product, a layer sensitive to light comprising 40 parts gelatine, 5 parts dinitrito tetramine cobaltic chloride, 6 parts of an azo dye component and 500 parts water.

8. As a new product, a layer sensitive to light comprising a vehicle, an azo dye component, a nitrogen compound, capable, when exposed to light, to set free an $NO_2$-compound and a simple metal salt sensitive to light.

9. As a new product, a layer sensitive to light comprising a vehicle, an azo dye component, a nitrogen compound capable, when exposed to light, to set free an $NO_2$-compound and a silver salt sensitive to light.

10. As a new product, a layer sensitive to light comprising a vehicle and a nitrito-complex salt and a silver salt sensitive to light.

11. As a new product, a layer sensitive to light comprising 40 parts gelatine, 5 parts dinitrito tetramine cobaltic chloride, 6 parts of an azo component, 1 part silver chloride and 500 parts water.

12. As a new article of manufacture, a carrier and a sensitive layer on said carrier comprising an azo dye component and a nitrogen compound capable, when exposed to light, to set free an $NO_2$-compound.

13. The method of producing photographic printing material comprising distributing in a vehicle an azo dye component and a nitrogen compound capable, when exposed to light, to set free an $NO_2$-compound, and applying the mixture thus obtained to a carrier.

In testimony whereof, I affix my signature.

ROBERT SCHWARZ.